United States Patent [19]
Rinkewich

[11] Patent Number: 5,294,140
[45] Date of Patent: Mar. 15, 1994

[54] SELF-PROPELLED VEHICLE

[76] Inventor: Isaac Rinkewich, P.O. Box 1209, Hightstown, N.J. 08520

[21] Appl. No.: 944,769

[22] Filed: Sep. 14, 1992

Related U.S. Application Data

[63] Continuation-in-part of Ser. No. 787,178, Nov. 4, 1991, abandoned, which is a continuation-in-part of Ser. No. 528,398, May 25, 1990, Pat. No. 5,066,031.

[51] Int. Cl.$^5$ .............................................. B62M 1/04
[52] U.S. Cl. ..................................... 280/221; 280/258
[58] Field of Search .................................. 280/221, 258

[56] References Cited
U.S. PATENT DOCUMENTS 1,571,562  2/1926  Tingley .................................. 280/221
4,779,863  10/1988  Yang ..................................... 280/221

Primary Examiner—Mitchell J. Hill
Attorney, Agent, or Firm—Benjamin J. Barish

[57] ABSTRACT

A self-propelled vehicle includes a frame having a pair of foot treadles mounted in side-by-side relation and depressible with respect to the frame; an overrunning clutch for each of the foot treadles and having a drive member coupled to its respective foot treadle and a driven member coupled to the drive wheel; and a planetary gear assembly for each of the overrunning clutches for coupling the drive member to the respective foot treadle such as to multiply, by a factor of at least two, the displacement of the clutch driven member by its respective foot treadle.

11 Claims, 3 Drawing Sheets

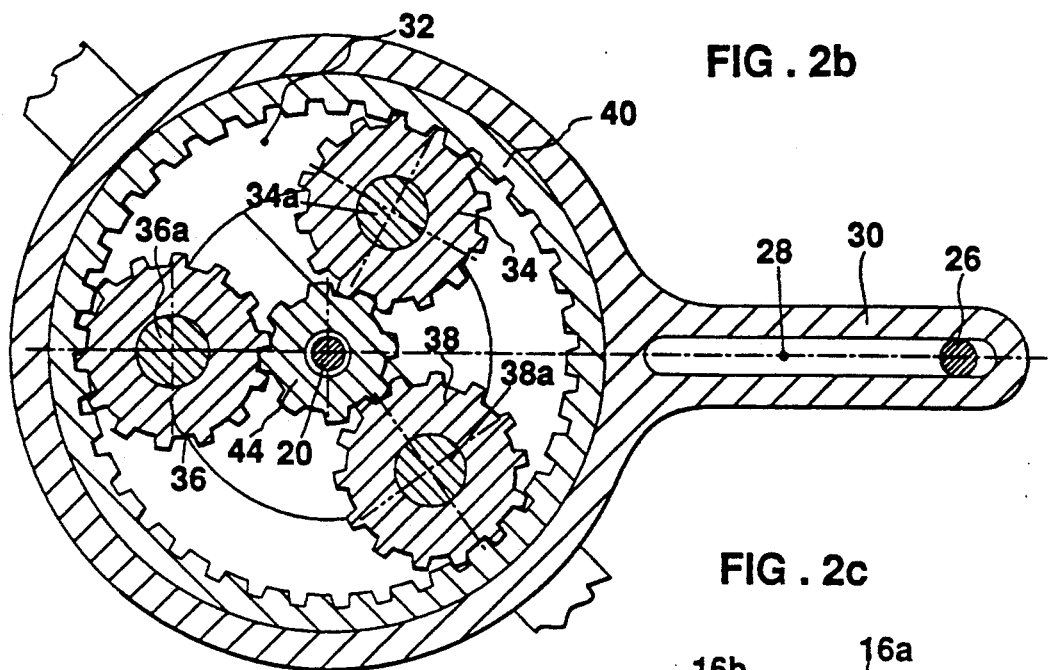
FIG. 2b
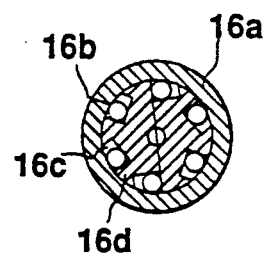
FIG. 2c
FIG. 3
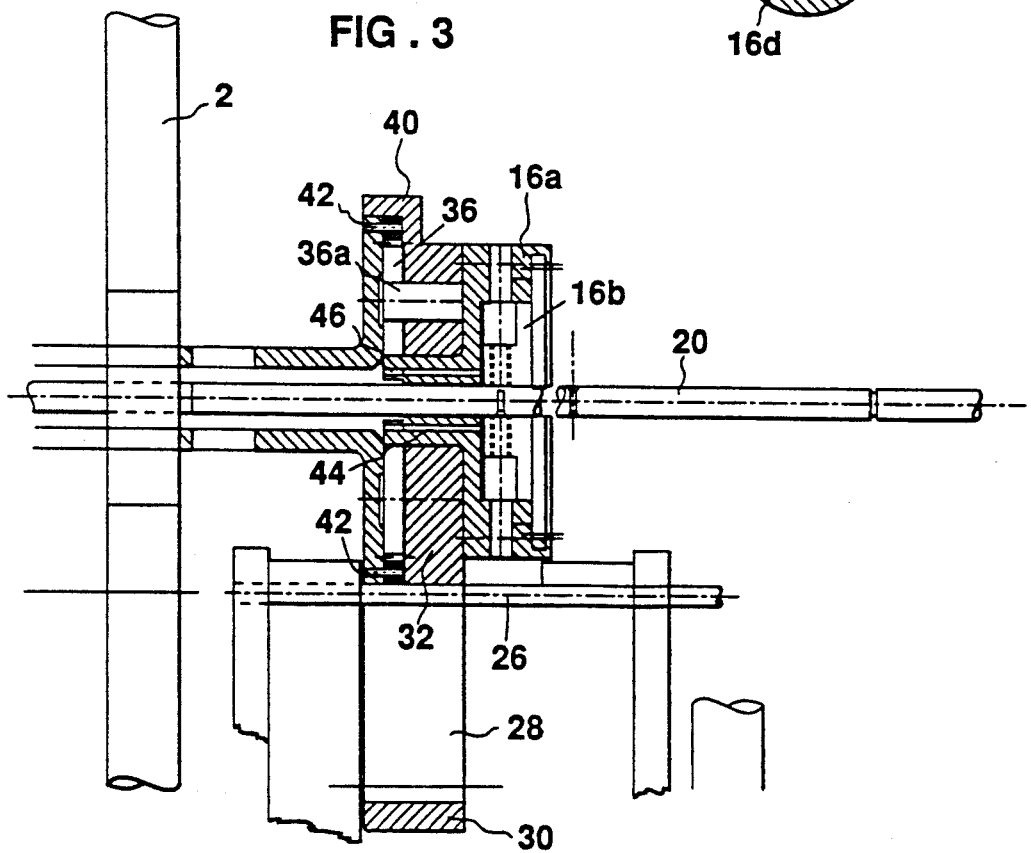

SELF-PROPELLED VEHICLE

RELATED APPLICATIONS

The present application is a continuation-in-part of my application Ser. No. 07/787,178 filed Nov. 4, 1991, now abandoned which application is in turn a continuation-in-part of my application Ser. No. 07/528,398 filed May 25, 1990, now U.S. Pat. No. 5,066,031.

FIELD AND BACKGROUND OF THE INVENTION

The present invention relates to self-propelled vehicles, and particularly to self-propelled vehicles of the scooter type propelled by the operator's feet.

A large number of self-propelled scooter constructions have been proposed, as illustrated for example in U.S. Pat. Nos. 1,237,969, 1,440,372, 1,529,952, 1,571,562, 2,062,830, 2,183,534, 2,723,131, 3,175,844, 3,180,656, 3,992,029, 4,124,222, 4,779,863 and 4,846,488, Belgian Patent 411,107, British Patent 603,916, and French Patents 501,552 and 754,319. Such proposed constructions, however, have generally not been entirely satisfactory for one reason or another, and apparently have not found widespread use.

An object of the present invention is to provide a self-propelled vehicle of the foregoing type but having advantages over the prior known constructions.

BRIEF SUMMARY OF THE INVENTION

According to the present invention, there is provided a self-propelled vehicle, comprising: a frame having a drive wheel at one end and another wheel at its opposite end; a pair of foot treadles mounted to the frame in side-by-side relation and depressible with respect to the frame; an overrunning clutch for each of the foot treadles and having a drive member coupled to its respective foot treadle and a driven member coupled to the drive wheel; and a planetary gear assembly between each of the foot treadles and the drive wheel, and effective to multiply, by a factor of at least two, the displacement of the drive wheel by its respective foot treadle.

As will be described more particularly below, the operator of such a vehicle may produced a relatively high propelling velocity by merely shifting the operator's weight from one foot treadle to the other. In the preferred embodiment of the invention described below, the planetary gear assembly multiplies the displacement of the drive wheel by a factor of at least five.

According to further features in the described preferred embodiment, the planetary gear assembly includes an internal gear fixed to the frame; a plurality of planetary gears meshing with the internal gear and coupled to the respective foot treadle so as to be displaced angularly by the depression of the foot treadle with respect to the frame; and a sun gear meshing with the planetary gears and coupled to the drive member of the respective overrunning clutch. More particularly, each of the planetary gear assemblies includes three planetary gears. These gears are coupled to their respective foot treadle by a drive pin fixed to the foot treadle movable within an elongated slot formed in an arm extending from a rotatable disc carrying the plurality of planetary gears. Such an arrangement provides a compact construction for the vehicle.

In one described embodiment, each of the foot treadles is carried by a lever pivotally mounted at one end to the frame and coupled to the planetary gear assembly at its opposite end. In a second described embodiment, each of the foot treadles is carried by a four-link parallelogram effective to retain the respective foot treadle substantially parallel to the longitudinal axis of the vehicle frame as the foot treadle is driven downwardly by the operator's foot to propel the vehicle.

Further features and advantages of the invention will be apparent from the description below.

BRIEF DESCRIPTION OF THE DRAWINGS

The invention is herein described, by way of example only, with reference to the accompanying drawings, wherein:

FIGS. 2a, 2b and 2c are sectional views along lines a—a, b—b and c—c of FIG. 2;

FIG. 3 is a sectional view along line III—III of FIG. 2b;

DESCRIPTION OF PREFERRED EMBODIMENTS

Figure 1:
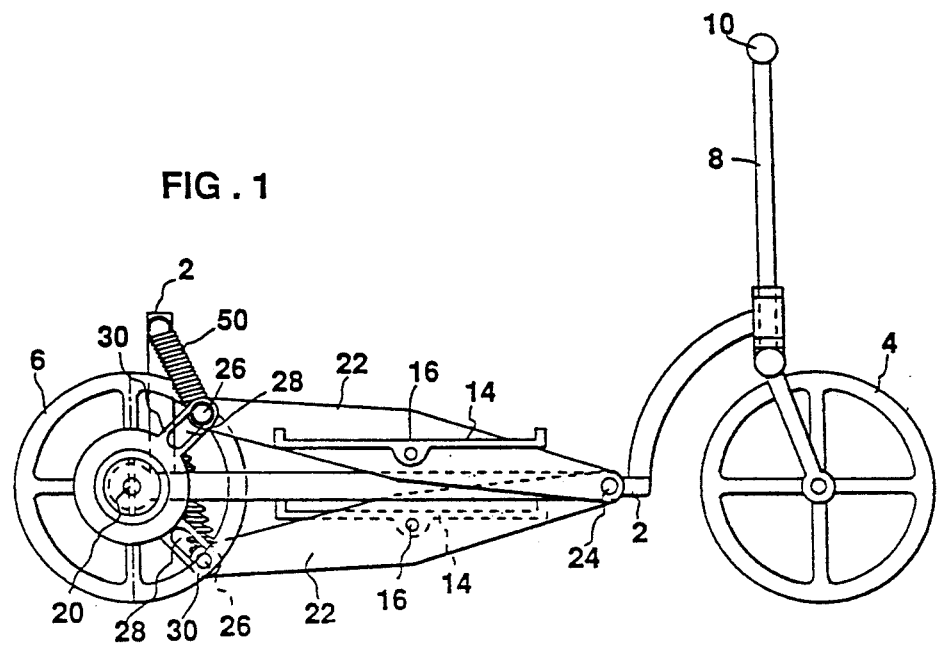
FIG. 1 is a side elevational view illustrating one form of self-propelled vehicle constructed in accordance with the present invention.
Figure 2:
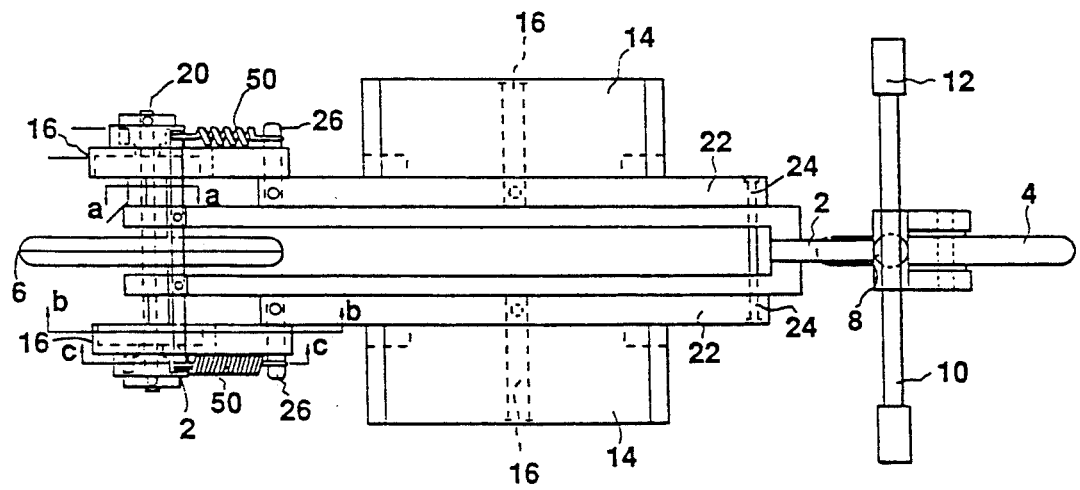
FIG. 2 is a top plan view of the vehicle of FIG. 1.
Figure 2A:

The Embodiment of FIGS. 1-3

The vehicle illustrated in FIGS. 1-3 of the drawings is a two-wheel scooter, including a frame, generally designated 2, a single front wheel 4, and a single rear wheel 6. The rear wheel 6 serves as the drive wheel, and the front wheel 4 supports the steering mechanism including a vertical bar 8 and a horizontal bar 10 having handle grips 12 on its opposite ends.

The scooter is self-propelled by a pair of foot treadles 14 mounted to the frame 2 in side-by-side relation and depressible with respect to the frame 2 by the operator shifting the body weight from one foot to the other. Each foot treadle 14 is coupled to the drive wheel 6 by an overrunning clutch 16 and a planetary gear assembly 18 (see FIGS. 2b and 3). Each overrunning clutch 16 is effective to couple its respective foot treadle 14 to the drive shaft 20 of the rear wheel 6 during the downward power stroke of the foot treadle, and to decouple the foot treadle from the drive shaft during the return upstroke of the foot treadle. Each planetary gear assembly 18 is effective to multiply the displacement of the drive wheel by a factor of at least two, and preferably of at least five, in order to produce a relatively high propelling velocity.

More particularly, each of the foot treadles 14 is pivotally mounted at its center to a lever 22, which in turn is pivotally mounted to the frame 2 about a pin 24 adjacent to the front wheel 4 of the vehicle. The opposite end of lever 22 carries a drive pin 26 movable within an elongated slot 28 in an arm 30. Arm 30 projects from one end of a circular disc 32 rotatable about the axis of shaft 20 of the drive wheel 6.

Three planetary gears 34, 36, 38, are rotatably mounted on disc 32 by means of their respective pins 34a, 36a, 38a. Planetary gears 34, 36, 38 mesh on their outwardly directed faces with an internal gear 40 which is fixed to the vehicle frame 2 by means of fasteners 42 (FIG. 3). The three planetary gears also mesh on their inwardly directed faces with a sun gear 44 coaxial with shaft 20.

Each overrunning clutch 16 includes an outer drive member 16a fixed to the sun gear 44 by fasteners 46 (FIG. 3), and an inner driven member 16b fixed to shaft 20 of the drive wheel 6. As shown particularly in FIG. 2c, the inner, driven cluth member 16b is formed on its outer surface with a plurality of wedge-shaped notches 16c, each receiving a roller member 16d. The construction is such that when the outer drive member 16a is rotated in a clockwise direction (FIG. 2b), the roller members 16d become wedged between the two clutch members 16a, 16b, to couple the driven member 16b to the drive member 16a; on the other hand, when the outer clutch member 16a is rotated in the opposite direction (counter-clockwise, FIG. 2b), the roller members 16d release the driven member 16b from the drive member 16a.

The two levers 22, to which the two foot treadles 14 are pivotally mounted, are urged to their upper positions by a spring 50 secured between the drive pin 26 of the respective lever and the vehicle frame 2.

It will thus be seen that when the operator depresses one of the foot treadles 14 by shifting the operator's weight to that foot treadle, its lever 22 is pivoted counter-clockwise about its pivot 24, thereby moving its drive pin 26 clockwise about the axis of the drive wheel shaft 20. This clockwise movement of the drive pin 26 produces a corresponding clockwise rotation of arm 30 and its disc 32, and thereby also of the three planetary gears 34, 36, 38. The latter gears, meshing with the fixed internal gear 40, rotate counter-clockwise about their respective axes 34a, 36a, 38a and thereby produce a clockwise rotation of the sun gear 44 meshing with the inner faces of the three planetary gears. The clockwise rotation of sun gear 46 also rotates the outer drive member 16b of the overrunning clutch 16 in the clockwise direction, and this clockwise rotation is transmitted to the inner driven clutch member 16b via the rollers 16d of the overrunning clutch which become wedged in the notches 16c of the driven member 16b. Since the latter member is coupled to shaft 20 of the vehicle drive wheel 6, the vehicle will be propelled in the forward direction during this downward movement of the foot treadle 14.

At the end of the downward movement of one foot treadle 14, the weight is shifted to the other foot treadle, whereupon the same propelling force is applied to the drive shaft 20 of the vehicle wheel 6. During this power descent of one foot treadle 14, the other foot treadle returns to its normal position under the action of its return spring 50. This return movement of the foot treadle is permitted by the decoupling action of its respective overrunning clutch 16.

It will thus be seen that the operator may easily propel the scooter by merely shifting the operator's weight from one foot to the other, and may coast by keeping the weight distributed between both foot treadles so that neither is depressed. It will also be seen that the planetary gear assembly 18, including the planetary gears 34, 36, 38, the fixed internal gear 40, and the sun gear 44, multiplies the angular displacement of the drive wheel by a factor which depends on the number of teeth in the internal gear 40 compared to the number of teeth in the sun gear 44. This multiplication factor should be at least two; preferably it is at lest five, so that a relatively high velocity of propulsion is attained by the operator when shifting weight from one foot treadle to the other.

Figure 4:
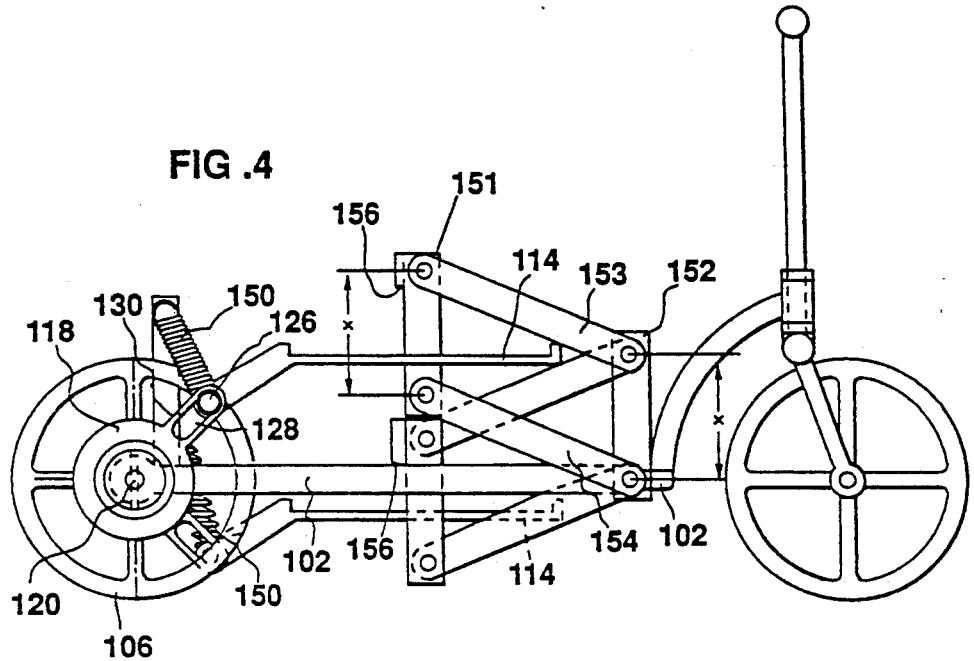
FIG. 4 is a side elevational view of another self-propelled vehicle constructed in accordance with the present invention.
Figure 5:
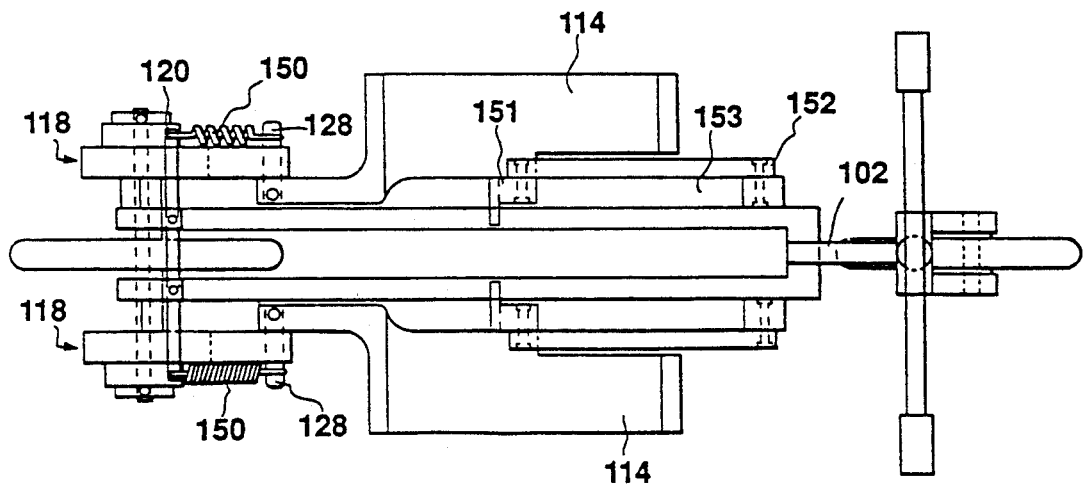
FIG. 5 is a top plan view of FIG. 4.

The Embodiment of FIGS. 4 and 5

FIGS. 4 and 5 illustrate a variation wherein the two foot treadles, therein designated 114, are each pivotally mounted to a four-link parallelogram which retains the respective foot treadle substantially parallel to the longitudinal axis of the vehicle frame 102 as the foot treadle is driven downeardly by the operator's foot to propel the vehicle, and as it is returned upwardly by the return springs 150.

Thus, in this variation, each four-link parallelogram includes two vertical links 151, 152, pivotally mounted at their opposite ends to the opposite ends of two substantially horizontal links 153, 154. The foot treadle 114 is fixed to one vertical link 151 so that it moves only in the vertical direction with that link. The end of the foot treadle adjacent to the rear drive wheel 106 carries the drive pin 126 movable within slot 128 of the arm 130 which drives the planetary gear assembly and the overrunning clutch coupled to the drive shaft 120 of the vehicle drive wheel 106. The planetary gear assembly and the overrunning clutch, both shown within housing 118 in FIGS. 4 and 5, are of the same construction as described above with respect to FIGS. 1-3.

The downward movement of each foot treadle 114 is limited by a projection 156 projecting rearwardly from the upper end of vertical link 151 of each parallelogram. Each projection 156 engages the vehicle frame 102 at the end of the downward movement of the foot treadle.

While the invention has been described with respect to two preferred embodiments, it will be appreciated that these are set forth purely for purposes of example, and that many other variations, modifications and applications of the invention may be made.

What is claimed is:

1. A self-propelled vehicle, comprising:
    a frame having a drive wheel at one end and another wheel at its opposite end;
    a pair of foot treadles mounted to the frame in side-by-side relation and depressible with respect to the frame;
    an overrunning clutch for each of said foot treadles and having a drive member coupled to its respective foot treadle and a driven member coupled to said drive wheel;
    and a planetary gear assembly between each of said foot treadles and said drive wheels, and effective to multiply, by a factor of at least two, the displacement of said drive wheel by its respective foot treadle; each of said planetary gear assemblies including:
    an internal gear fixed to the frame;
    a plurality of planetary gears meshing with said internal gear and coupled to the respective foot treadle so as to be displaced angularly by the depression of the foot treadle with respect to the frame;
    and a sun gear meshing with said planetary gears and coupled to said driven member of the respective overrunning clutch.

2. The self-propelled vehicle according to claim 1, wherein said planetary gear assembly multiplies the displacement of the drive wheel by its respective foot treadle by a factor of at least five.

3. The self-propelled vehicle according to claim 1, wherein each of said planetary gear assemblies includes three of said planetary gears.

4. The self-propelled vehicle according to claim 1, wherein said plurality of planetary gears are coupled to the respective foot treadle by a drive pin coupled to the foot treadle and movable within an elongated slot formed in an arm extending from a rotatable disc carrying said plurality of planetary gears.

5. The self-propelled vehicle according to claim 4, wherein said sun gear of each planetary gear assembly is joined to said drive member of the overrunning clutch, the driven member of the overrunning clutch being coupled to its respective drive member by a plurality of rolling elements received within notches formed in the respective driven member.

6. The self-propelled vehicle according to claim 4, further including a return spring interposed between said drive pin and the frame to return the foot treadle to its normal position after its depression.

7. The self-propelled vehicle according to claim 1, wherein each of said foot treadles is carried by a lever pivotally mounted at one end to the frame and coupled to said planetary gear assembly at its opposite end.

8. The self-propelled vehicle according to claim 7, wherein each of said foot treadles is pivotally mounted at its center to its respective lever.

9. The self-propelled vehicle according to claim 1, wherein each of said foot treadles is carried by a four-link parallelogram effective to retain the respective foot treadle substantially parallel to the longitudinal axis of the vehicle frame as the foot treadle is driven downwardly by the operator's foot to propel the vehicle.

10. The self-propelled vehicle according to claim 9, wherein each of said four-link parallelograms includes two vertical links displaceable through vertical paths by two substantially horizontal links pivotally mounted to the opposite ends of the vertical links, the foot treadle being fixed to one of the vertical links of the respective parallelogram.

11. The self-propelled vehicle according to claim 10, wherein one of said vertical links includes a stop engageable with a part of the frame in order to limit the depressed position of the respective foot treadle.

* * * * *